April 6, 1954 L. G. STONE 2,674,016

REMOVABLE PANEL

Filed Jan. 16, 1952

INVENTOR.

Leland Geo. Stone

Patented Apr. 6, 1954

2,674,016

UNITED STATES PATENT OFFICE 2,674,016

REMOVABLE PANEL

Leland G. Stone, Fort Wayne, Ind., assignor to International Telephone and Telegraph Corporation, a corporation of Maryland Application January 16, 1952, Serial No. 266,761

2 Claims. (Cl. 20—56.1)

This invention relates generally to television cabinets and more particularly to a structure for mounting a glass panel in the front side of a television cabinet.

Conventional television cabinets are arranged so that the face of the picture reproducing tube may be exposed for viewing through the front side of the cabinet. For protective purposes, a glass panel is ordinarily mounted in front of the tube face so that the tube face may be protected from damage and also so that implosion of the tube will not result in damage to the picture viewer. According to conventional practice, the glass panel has been mounted on the frame work of the cabinet by means of special plates or moldings screwed across the corners of the glass panel or along its sides. Since the glass panel must be removable in order to provide for cleaning of the picture reproducing tube and also for its removal from the television chassis, it is found that the conventional fastening apparatus such as plates are awkward to remove and their removal sometimes results in damage to the glass panel. Removal of plates, moldings and the like also causes marring of the plates, the heads of the screws, and the cabinet surfaces thereby detracting from the appearance of the front of the cabinet. In fact, the overall appearance of a television cabinet is somewhat impaired by the use of plates or the like.

Conventional methods of mounting glass panels are also rather expensive in that it is necessary to provide an appreciable number of parts simply for the purpose of mounting the panel. Consequently, the labor involved in attaching these parts is also an appreciable item of expense in the manufacture of a television receiver.

Accordingly, it is the principal object of this invention to provide a novel apparatus for mounting a glass panel in a television cabinet.

Another object of this invention is to provide, in a television receiver, cabinet structure adapted securely to mount a glass panel which permits removal of the glass panel without damage to the panel or to the cabinet.

Still another object of this invention is to provide, in a television receiver, cabinet structure for securely mounting a glass panel which is substantially invisible and consequently does not in any way mar the artistic appearance of the cabinet.

In accordance with this invention there is provided a television receiver cabinet having grooves in the frame adjacent to the front end of a television picture receiving tube which grooves are adapted to receive a glass panel, and a locking means for fixing the glass panel within said grooves.

For a better understanding of the invention, together with other and further objects thereof, reference is made to the following description, taken in connection with the accompanying drawings, and its scope will be pointed out in the appended claims.

Figures 1, 2:
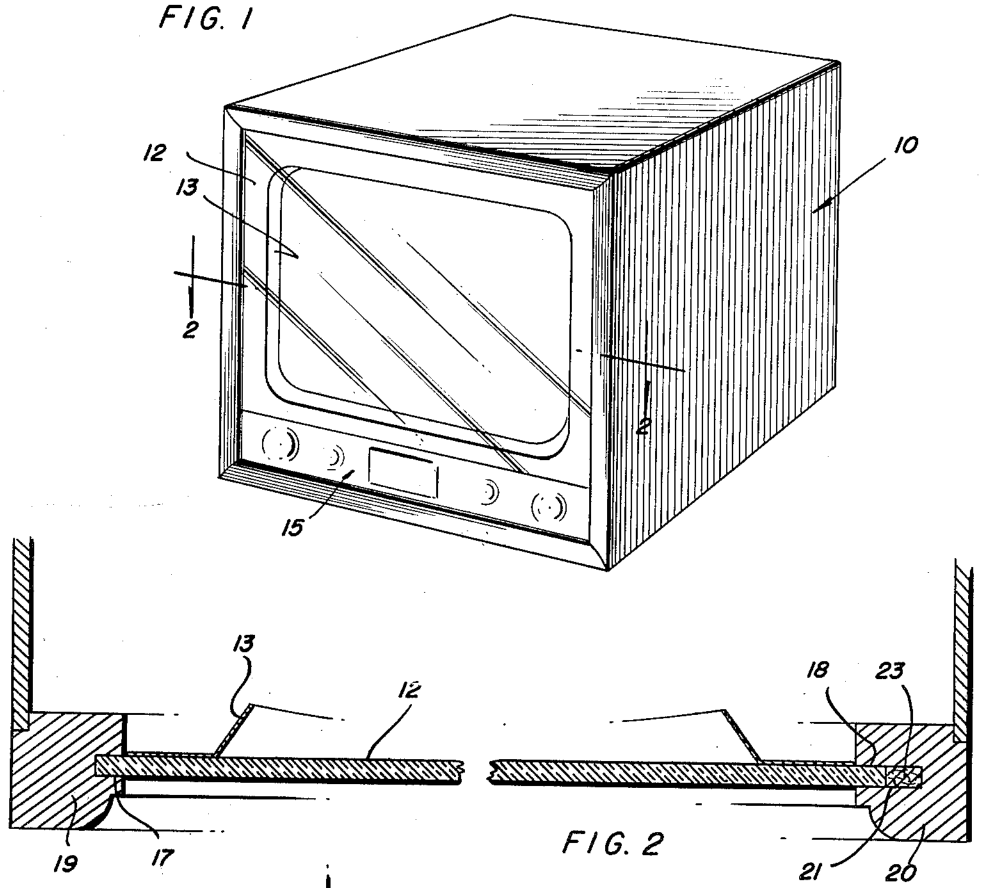
Fig. 1 is a perspective view of a television cabinet having incorporated therein a glass panel mounting structure as provided in accordance with this invention.
Fig. 2 is a cross-section taken on line 2—2 of Fig. 1.

Fig. 1 of the drawings illustrates a typical television cabinet 10 having a glass panel 12 mounted in the front thereof behind which is a mask 13 adapted to provide a frame around the picture reproducing screen of a television receiving tube. The glass plate 12 extends from the top of the cabinet downward into engagement with a control panel and may be mounted in slots 17 and 18 in corner posts 19 and 20 of cabinet 10.

In order to removably mount panel 12 within the slots 17 and 18, slot 18, for example, may be made to have extra depth as at 21. Thus, panel 12 may be inserted into the space 21 thereby permitting the left hand end of panel 12 to be moved into register with the slot 17. By sliding panel 12 to the left into slot 17 the panel assumes its normal position in front of mask 13.

Figure 3:
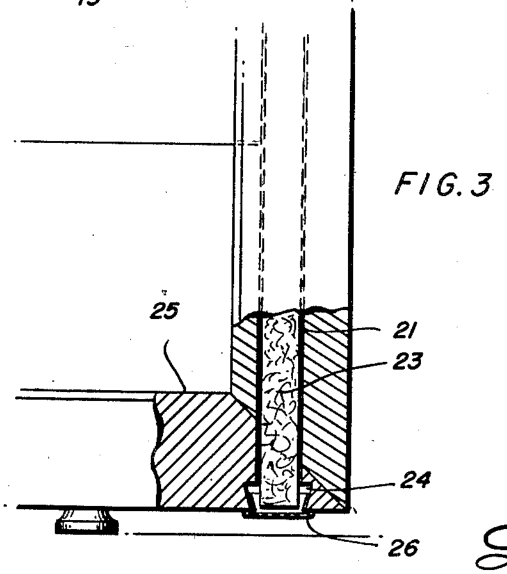
Fig. 3 is an enlarged detail view, partially in cross-section, showing the lower corner of the cabinet illustrated in Fig. 1.

For retaining panel 12 in slot 17 there is provided a filler strip 23 which may be felt or rubber material. After panel 12 has been positioned within the two slots it may be retained in this position by inserting a filler strip 23 through an aperture 24 in a bottom frame member 25 as illustrated in Fig. 3. For covering the aperture 22 and retaining the filler member 23 in its operative position there may be provided a removable cover 26.

From the foregoing description it will be apparent that there is provided in accordance with this invention a means for mounting a glass panel within the frame work of a television receiver which does not require any fastening plates, screws or other fastening mechanism. By utilizing the filler strip 23 it is possible to remove panel 12 without in any way disturbing any essential structure of the cabinet. No screws or other fastening devices need to be removed and consequently the appearance of the cabinet is not marred when it is desired to remove the panel. It should be noted that the means for securing panel 12 are entirely invisible from the exterior of the cabinet. A further advantage of this invention is that the need is eliminated for meeting close tolerances with respect to the dimensions of the panel 12, the grooves 17 and 18, and the cabinet dimensions. Filler strip 23, being of compressible or flexible material, automatically compensates for oversize or undersize dimensions of the various elements.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit or scope of the invention.

I claim:

1. In a cabinet structure, a frame for receiving a panel including a pair of spaced posts, transverse members connecting the ends of said posts, one of said posts being formed with a first groove of a certain depth and the other being formed with a second deeper groove, a panel having opposite edges positioned in said grooves with one edge in spaced relation from the bottom of said second groove, and a removable filler strip in the second groove between the edge of said panel and the bottom wall of said groove said filler member preventing movement of said panel toward said second groove bottom a distance sufficient for removal of said panel from said first groove.

2. In a cabinet structure, a frame for receiving a panel including a pair of spaced posts, transverse members connecting the ends of said posts, one of said posts being formed with a first groove of a certain depth and the other being formed with a second deeper groove, a panel having opposite edges positioned in said grooves with one edge in spaced relation from the bottom of said second groove, and a removable filler strip in the second groove between the edge of said panel and the bottom wall of said groove, one of said transverse members including an aperture connected with said second groove for providing access to said filler strip.

References Cited in the file of this patent

UNITED STATES PATENTS

| Number | Name | Date |
|---|---|---|
| 2,258,973 | Cross et al. | Oct. 14, 1941 |
| 2,596,710 | Moricco et al. | May 13, 1952 |